US010683428B2

(12) United States Patent
Kinjoh et al.

(10) Patent No.: US 10,683,428 B2
(45) Date of Patent: Jun. 16, 2020

(54) NONAQUEOUS INK-JET MAGENTA INK COMPOSITION

(71) Applicant: SAKATA INX CORPORATION, Osaka (JP)

(72) Inventors: Jun Kinjoh, Osaka (JP); Okinori Nakashima, Osaka (JP); Yoshiyuki Aoki, Osaka (JP); Ryohei Miyake, Osaka (JP)

(73) Assignee: SAKATA INX CORPORATION, Osaka (JP)

( * ) Notice: Subject to any disclaimer, the term of this patent is extended or adjusted under 35 U.S.C. 154(b) by 0 days.

(21) Appl. No.: 16/313,197

(22) PCT Filed: Apr. 13, 2017

(86) PCT No.: PCT/JP2017/015149
§ 371 (c)(1),
(2) Date: Dec. 26, 2018

(87) PCT Pub. No.: WO2018/003236
PCT Pub. Date: Jan. 4, 2018

(65) Prior Publication Data
US 2019/0161634 A1   May 30, 2019

(30) Foreign Application Priority Data

Jun. 29, 2016 (JP) .................... 2016-129395

(51) Int. Cl.
| C09D 11/033 | (2014.01) |
| C09D 11/037 | (2014.01) |
| C09D 11/322 | (2014.01) |
| C09D 11/36 | (2014.01) |
| C09B 48/00 | (2006.01) |
| B41M 5/00 | (2006.01) |
| C09B 57/00 | (2006.01) |
| C09D 11/106 | (2014.01) |
| C09D 11/107 | (2014.01) |

(52) U.S. Cl.
CPC ............. *C09D 11/322* (2013.01); *B41M 5/00* (2013.01); *B41M 5/0023* (2013.01); *C09B 48/00* (2013.01); *C09B 57/004* (2013.01); *C09D 11/033* (2013.01); *C09D 11/037* (2013.01); *C09D 11/106* (2013.01); *C09D 11/107* (2013.01); *C09D 11/36* (2013.01)

(58) Field of Classification Search
CPC ... C09D 11/033; C09D 11/037; C09D 11/322; C09D 11/36; C09B 48/00
See application file for complete search history.

(56) References Cited

U.S. PATENT DOCUMENTS

| 7,220,306 | B2 | 5/2007 | Kano et al. | |
| 7,220,307 | B2 | 5/2007 | Kano et al. | |
| 2008/0018676 | A1* | 1/2008 | Soroker | C09D 11/36 347/1 |
| 2009/0084286 | A1 | 4/2009 | Ganschow et al. | |
| 2014/0349087 | A1* | 11/2014 | Jung | C09D 11/322 428/195.1 |
| 2017/0114234 | A1 | 4/2017 | Konda | |

FOREIGN PATENT DOCUMENTS

| EP | 1 857 511 A1 | 11/2007 |
| EP | 2 157 143 A1 | 2/2010 |
| JP | 2004-083872 A | 3/2004 |
| JP | 2004-149633 A | 5/2004 |
| JP | 2007-269984 A | 10/2007 |
| JP | 2009-526880 A | 7/2009 |
| JP | 2009-209212 A | 9/2009 |
| JP | 2012-201017 A | 10/2012 |
| JP | 2014-084339 A | 5/2014 |
| JP | 2014-177551 A | 9/2014 |
| JP | 2015-183144 A | 10/2015 |
| WO | 03/076527 A1 | 9/2003 |
| WO | 2004/000950 A1 | 12/2003 |
| WO | 2007/093260 A2 | 8/2007 |
| WO | 2010/113588 A1 | 10/2010 |

OTHER PUBLICATIONS

English translation of the International Preliminary Report on Patentability and Written Opinion of the International Searching Authority in PCT/JP20171015149, dated Jan. 10, 2019.
International Search Report of PCT/JP2017/015149, dated Jun. 13, 2017.
"Cyclopaedia of Pigments, Initial Edition", Asakura Publishing Co., Ltd., Sep. 25, 2000, pp. 320-325 and 341-344 with English translation (29 pages).
Extended European Search Report dated Jan. 31, 2020 in European Application No. 17819604.4.

\* cited by examiner

*Primary Examiner* — Vu A Nguyen
(74) *Attorney, Agent, or Firm* — Collard & Roe, P.C.

(57) ABSTRACT

A non-aqueous magenta ink composition for ink jet printing comprising a pigment, a pigment dispersant, a binder resin and an organic solvent, wherein the pigment comprises C.I. Pigment Red 254 and a red pigment having a quinacridone skeleton, and wherein a total amount of the C.I. Pigment Red 254 and the red pigment having a quinacridone skeleton is not less than 50% by mass in the pigment.

5 Claims, No Drawings

NONAQUEOUS INK-JET MAGENTA INK COMPOSITION

CROSS REFERENCE TO RELATED APPLICATIONS

This application is the National Stage of PCT/JP2017/015149 filed on Apr. 13, 2017, which claims priority under 35 U.S.C. § 119 of Japanese Application No. 2016-129395 filed on Jun. 29, 2016, the disclosures of which are incorporated by reference. The international application under PCT article 21(2) was not published in English.

TECHNICAL FIELD

The present invention relates to a non-aqueous magenta ink composition for ink jet printing, in particular to a non-aqueous magenta ink composition for ink jet printing having excellent weather resistance and being hardly subject to color-degradation.

BACKGROUND ART

In recent signboard advertisement, there are increasing number of photo-like objects such as an appearance of a commercial article and a face of a person besides logotypes and patterns of a vivid and sophisticated design. Further, many large size advertisement boards are seen in order to give viewers a stronger impact. So far, for making an advertisement board, usually a colored sheet is cut into shapes of characters and paste up them on the board in the case of logotypes, and various printers are used in the case of photo-like objects. Therefore, there was a problem such that it took a lot of time and labor for manufacturing of the board, and a large-scale printer was required. So, in order to easily manufacture an advertisement board having a vivid image thereon, a trial for using an ink jet method which can print a design created in a personal computer directly on a substrate has been attempted.

An ink jet method is characterized in that a width of a material usable as a printing substrate is wide and printing can be made easily even on sheets made of paper, polymer, metal and other hard and soft materials. In particular, in the case of an advertisement board installed outside, characteristics such as a light weight, excellent strength and durability, weather resistance and low cost are demanded. Therefore, being capable of easily printing on a polymer sheet having such characteristics is a great merit. In addition thereto, recently an ink jet printer of an ultra wide format having a printing width of 2,000 mm or more is available, thereby enabling a large-size printed matter to be printed at a stroke though the large-size advertisement board has been made by pasting. Thus, advertisement boards will be able to be manufactured more easily.

Generally a polymer sheet called Tarpaulin is used as a polymer sheet used on advertisement boards. Tarpaulin is a complex sheet manufactured by using polyester or polyamide as a core material and applying a vinyl polymer such as polyvinyl chloride or an ethylene-vinyl acetate copolymer to top and bottom surfaces of the core material. A non-aqueous ink composition for ink jet printing prepared using an organic solvent (recently environmentally friendly organic solvent) as a base material is used as an ink composition for ink jet printing printed on such a complex sheet. It is necessary to use, as a non-aqueous ink composition for ink jet printing, materials having good wettability, drying characteristics and fixing property relative to polyvinyl chloride or an ethylene-vinyl acetate copolymer which is a material used on top and bottom surfaces of the core material.

By the way, among non-aqueous ink jet inks, different hues are demanded for a non-aqueous magenta ink composition for ink jet printing in various countries. Especially in China and Korea, such non-aqueous magenta ink composition for ink jet printing has strong yellowness (high b* value). In order to exhibit a color having such a strong yellowness, an ink jet ink using a pigment comprising C.I. Pigment Red 146 has been proposed in Patent Document 1.

PRIOR ART DOCUMENT

Patent Document

Patent Document 1: JP 2004-149633 A

SUMMARY OF THE INVENTION

However, the ink jet ink using a pigment of Patent Document 1 is an aqueous ink. Such an ink does not have sufficient weather resistance and is subject to color degradation within around six months.

The present invention was made in the light of the above-mentioned conventional problems, and an object of the present invention is to provide a non-aqueous magenta ink composition for ink jet printing being excellent in weather resistance and hard to be color-degraded.

The inventors of the present invention have made intensive studies to solve the above-mentioned problems, and as a result, have found that an obtained non-aqueous magenta ink for ink jet printing is excellent in weather resistance and hard to be color-degraded by compounding a specific amount of predetermined pigments. Thus, the present invention has been completed. Namely, the non-aqueous magenta ink composition for ink jet printing of one aspect of the present invention for solving the above-mentioned problem is a non-aqueous magenta ink composition for ink jet printing comprising a pigment, a pigment dispersant, a binder resin and an organic solvent, wherein the pigment comprises C.I. Pigment Red 254 and a red pigment having a quinacridone skeleton, and wherein a total amount of the C.I. Pigment Red 254 and the red pigment having a quinacridone skeleton is not less than 50% by mass in the pigment.

EMBODIMENT FOR CARRYING OUT THE INVENTION

<Non-Aqueous Magenta Ink Composition for Ink Jet Printing>

The non-aqueous magenta ink composition for ink jet printing according to one embodiment of the present invention (hereinafter referred to as ink composition) comprises a pigment, a pigment dispersant, a binder resin and an organic solvent. The pigment comprises a specific amount of C.I. Pigment Red 254 and a red pigment having a quinacridone skeleton. The respective pigments will be explained below.
(Pigment)

The pigment according to the present embodiment comprises C.I. Pigment Red 254 and a red pigment having a quinacridone skeleton. The pigment may comprise the above-mentioned two kinds of pigments. Therefore, the pigment may comprise other pigments. Examples of the red pigment having a quinacridone skeleton include C.I. Pigment Red 202, 207, 209, C.I. Pigment Violet 19 and the like, and preferable are C.I. Pigment Violet 19 and C.I. Pigment Red 122, 202, and more preferable is C.I. Pigment Red 122. In the case where the red pigment comprises at least any one selected from C.I. Pigment Violet 19, C.I. Pigment Red 122 and C.I. Pigment Red 202, yellowish and especially clear magenta color is developed easily on an obtained ink jet image. Further, the obtained ink jet image is excellent in weather resistance and is hardly subject to color degradation. Especially in the case where the red pigment comprises C.I. Pigment Red 122, the above-mentioned effect becomes more significant.

Examples of other pigments include Naphthol AS pigments and the like. Examples of Naphthol AS pigments include C.I. Pigment Red 2, 5, 7, 8, 9, 12, 23, 32, 112, 114, 146, 147, 148, 170, 176, 184, 185, 187, 188, 245, 261, 269 and the like.

In the pigment according to the present embodiment, a total amount of the C.I. Pigment Red 254 and the red pigment having a quinacridone skeleton may be not less than 50% by mass, preferably not less than 70% by mass, more preferably 100% by mass in the pigment. When the total amount is less than 50% by mass, weather resistance and color gamut of the obtained ink jet image are hardly consistent with each other.

Further, in the pigment according to the present embodiment, a compounding ratio of the C.I. Pigment Red 254 and the red pigment having a quinacridone skeleton is preferably 8:2 to 2:8, more preferably 4:6 to 6:4. When the compounding ratio of the pigments is within the above-mentioned range, yellowish and clearer magenta color is developed on the obtained ink jet image. Also, the obtained ink jet image is excellent in weather resistance and is hardly subject to color degradation.

(Pigment Dispersant)

A pigment dispersant is compounded for enhancing dispersion of the above-mentioned pigments in an organic solvent. The pigment dispersant is not limited particularly. Examples of the pigment dispersant include ionic or nonionic low molecular surfactants and anionic, cationic or nonionic polymer compounds. The pigment dispersant may be selected appropriately depending on kinds of pigments to be used, kinds of organic solvents to be used and the like. Among these, the pigment dispersant is preferably the above-mentioned polymer compounds, and more preferable are carbodiimide compounds described in JP 2004-083872 A, WO2003/076527 and WO2004/000950, AJISPER available from AJINOMOTO CO., INC., SOLSPERSE available from The Lubrizol Corporation, DISPERBYK available from BYK-Chemie Japan KK, EFKA available from EFKA Additives B.V. and the like. These pigment dispersants may be used in combination. It is noted that the above-mentioned pigment dispersants may be selected appropriately depending on kinds of the pigments, kinds of organic solvents to be used and the like.

(Binder Resin)

The binder resin is compounded for the purpose of enhancing a fixing property of a substrate. The binder resin is not limited particularly. As one example of the binder resin, it is preferable that the binder resin comprises at least either of a vinyl polymer or an acrylic resin. In this case, it is more preferable that the vinyl polymer comprises at least one selected from the group consisting of a vinyl chloride polymer, a vinyl chloride-vinyl acetate copolymer and an ethylene-vinyl acetate copolymer.

Examples of the vinyl chloride polymer include a homopolymer of vinyl chloride (polyvinyl chloride), and a copolymer of vinyl chloride with a small amount of a copolymerizable monomer (for example, vinyl acetate, ethylene, vinylidene chloride or the like). Vinyl chloride-vinyl acetate copolymers and ethylene-vinyl acetate copolymers which have been usually used in a field of a non-aqueous ink-jet ink composition can be used without any particular limitation.

Examples of the acrylic resin include a polymer comprising (meth)acrylate being soluble in an organic solvent and a copolymer thereof. Examples of (meth)acrylate include an alkyl (meth)acrylate such as ethyl, propyl or butyl (meth)acrylate; a hydroxyalkyl (meth)acrylate such as hydroxymethyl, hydroxyethyl, hydroxypropyl, hydroxybutyl or hydroxypentyl (meth)acrylate; and the like.

More specifically, examples of the acrylic resin include BR-60 (Tg: 75° C.), BR-64 (Tg: 55° C.), BR-75 (Tg: 90° C.), BR-77 (Tg: 80° C.), BR-87 (Tg: 105° C.), BR-88 (Tg: 105° C.), BR-90 (Tg: 65° C.), BR-93 (Tg: 50° C.), BR-95 (Tg: 80° C.), BR-105 (Tg: 50° C.), BR-106 (Tg: 50° C.), BR-107 (Tg: 50° C.), BR-108 (Tg: 90° C.), BR-113 (Tg: 75° C.), BR-115 (Tg: 50° C.), BR-116 (Tg: 50° C.) and the like available from MITSUBISHI RAYON CO., LTD.

It is noted that in the case of combination use of a vinyl chloride polymer with an acrylic resin, a Tg thereof is preferably 70° C. or higher from a point of further enhancing drying characteristics, blocking tendency and coating film resistance of an obtained ink composition.

An amount of the vinyl chloride resin and a total amount of the vinyl chloride resin and the acrylic resin are preferably not less than 1% by mass, more preferably not less than 1.5% by mass based on a total amount of the ink composition. On the other hand, these amounts are preferably not more than 15% by mass, more preferably not more than 10% by mass, further preferably not more than 7% by mass based on a total amount of the ink composition. When the total amount of the binder resin is less than 1% by mass, there is a tendency that a fixing property of the ink composition to a substrate is not sufficient. On the other hand, when the total amount of the binder resin exceeds 15% by mass, there is a tendency that a solid content in the ink composition becomes too much, thereby decreasing ejection stability of the ink composition.

A molecular weight of the binder resin is not limited particularly. One example of the molecular weight of the binder resin is such that a weight-average molecular weight thereof is preferably about 2,000 to about 100,000 from a point of solubility in an organic solvent, a viscosity of an obtained ink composition and excellent injection stability.

It is noted that in the binder resin according to the present embodiment, resins other than those mentioned above may be used in combination within a range not lowering performance. Examples of such resins include a styrene-acrylic resin, a styrene-maleic acid resin, a rosin resin, a rosin ester resin, a petroleum resin, a coumarone-indene resin, a terpene-phenol resin, a phenolic resin, a urethane resin, a melamine resin, a urea resin, an epoxy resin, a cellulose resin, a xylene resin, an alkyd resin, an aliphatic hydrocarbon resin, a butyral resin, a maleic acid resin, a fumaric acid resin and the like.

(Organic Solvent)

An organic solvent is a predominant solvent for the ink composition according to the present embodiment. The organic solvent is not limited particularly. It is preferable that the organic solvent according to the present embodiment comprises alkylene glycol dialkyl ether which is a liquid under normal temperature and normal pressure.

Examples of the alkylene glycol dialkyl ether include (poly)ethylene glycol dialkyl ether, (poly)propylene glycol dialkyl ether and the like. It is preferable that among these, the organic solvent is (poly)ethylene glycol dialkyl ether from a point of excellent drying characteristics of an obtained ink composition.

Examples of the (poly)ethylene glycol dialkyl ether include ethylene glycol diethyl ether, ethylene glycol dimethyl ether, ethylene glycol ethylmethyl ether, diethylene glycol ethylmethyl ether, diethylene glycol dimethyl ether, diethylene glycol diethyl ether, diethylene glycol dibutyl ether, triethylene glycol dimethyl ether, triethylene glycol diethyl ether, tetraethylene glycol dimethyl ether and the like.

Examples of the (poly)propylene glycol dialkyl ether include propylene glycol dimethyl ether, propylene glycol diethyl ether, dipropylene glycol dimethyl ether, dipropylene glycol diethyl ether and the like.

It is preferable that at least one selected from cyclic ester compounds, (poly)propylene glycol monoalkyl ether and (poly)propylene glycol monoalkyl ether monoalkyl ester is further used as the organic solvent according to the present embodiment from a point of enhancing quality of an obtained ink jet image.

Examples of the cyclic ester compounds include cyclic ester compounds such as γ-butyrolactone, γ-valerolactone, γ-caprolactone, γ-caprylolactone, γ-laurolactone, γ-lactone, δ-lactone such as δ-valerolactone, ε-caprolactone and ε-lactone, cyclic carbonate ester compounds such as propylene carbonate and the like. Among these, the cyclic ester compound is preferably γ-butyrolactone or propylene carbonate.

Examples of the (poly)propylene glycol monoalkyl ether include propylene glycol monomethyl ether, propylene glycol monoethyl ether, propylene glycol monobutyl ether, dipropylene glycol monomethyl ether, dipropylene glycol monoethyl ether and the like. Among these, propylene glycol monomethyl ether is more preferable as the (poly)propylene glycol monoalkyl ether.

Examples of the (poly)propylene glycol monoalkyl ether monoalkyl ester include propylene glycol monomethyl ether acetate, propylene glycol monoethyl ether acetate, propylene glycol monobutyl ether acetate, dipropylene glycol monomethyl ether acetate, dipropylene glycol monoethyl ether acetate, dipropylene glycol monobutyl ether acetate and the like. Among these, dipropylene glycol monomethyl ether acetate is more preferable as the (poly)propylene glycol monoalkyl ether monoalkyl ester.

In the present embodiment, a total amount of at least one selected from cyclic ester compounds, (poly)propylene glycol monoalkyl ether and (poly)propylene glycol monoalkyl ether monoalkyl ester is preferably not less than 1% by mass, more preferably not less than 5% by mass based on an amount of the ink composition. On the other hand, the total amount is preferably not more than 30% by mass, more preferably not more than 20% by mass. When the total amount is less than 1% by mass, there is a tendency that quality of an obtained ink jet image is easily deteriorated. On the other hand, when the total amount exceeds 30% by mass, there is a tendency that drying characteristics of an obtained ink jet image are lowered.

In the organic solvent according to the present embodiment, besides the above-mentioned organic solvent, (poly)ethylene glycol monoether such as ethylene glycol, diethylene glycol, triethylene glycol, propylene glycol, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether and tetraethylene glycol monobutyl ether; (poly)ethylene glycol monoether monoester such as ethylene glycol monomethyl acetate, ethylene glycol monoethyl acetate, ethylene glycol monobutyl acetate, diethylene glycol monomethyl acetate and triethylene glycol monomethyl acetate; (poly)ethylene glycol diester such as ethylene glycol diacetate, diethylene glycol diacetate and triethylene glycol diacetate; (poly)ethylene glycol monoether monoester such as ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, diethylene glycol monobutyl ether acetate, ethylene glycol propyl ether acetate, triethylene glycol monobutyl ether, triethylene glycol ethyl ether acetate and triethylene glycol butyl ether acetate; (poly)propylene glycol monoester such as propylene glycol monoacetate; (poly)propylene glycol diester such as propylene glycol diacetate and dipropylene glycol diacetate; ester organic solvents such as trimethylpentanediol diisobutyrate, hexyl acetate, octyl acetate, methyl lactate, ethyl lactate and butyl lactate; and the like may be used in combination.

A combination of these organic solvents is preferably a combination of (poly)alkylene glycol dialkyl ether with at least one selected from the cyclic ester compound, (poly)propylene glycol monoalkyl ether and (poly)propylene glycol monoalkyl ether monoalkyl ester, more preferably a combination of diethylene glycol dialkyl ether, triethylene glycol dialkyl ether and at least one selected from γ-butyrolactone, propylene carbonate, dipropylene glycol monomethyl ether and dipropylene glycol monomethyl ether acetate.

A content of the organic solvent is preferably not less than 80% by mass in the ink composition. On the other hand, the content of the organic solvent is preferably not more than 98% by mass in the ink composition. When the content of the organic solvent is less than 80% by mass, there is a tendency that a viscosity of an obtained ink composition easily increases and an ink ejection performance from nozzles is lowered. On the other hand, when the content of the organic solvent is more than 98% by mass, printability of an obtained ink composition tends to be lowered easily.

(Other Optional Components)

To the ink composition according to the present embodiment may be compounded according to necessity optional components such as other surfactants different from the above-mentioned pigment dispersant, a plasticizer, a surface treating agent, an ultraviolet inhibitor, a light stabilizer and an antioxidant.

Examples of the plasticizer include phthalic acid ester-based, adipate-based, phosphate-based, trimellitate-based, citrate-based, epoxy, polyester and polyalcohol plasticizers.

Examples of other surfactants include acetylene glycol and alkylene oxide adducts thereof.

Examples of a surface treating agent include an acrylic surface treating agent, a silicon surface treating agent and a fluorine-containing surface treating agent. Examples of concrete surface treating agents include BYK-350, 352, 354, 355, 358N, 361N, 381N, 381, 392, BYK-300, 302, 306, 307, 310, 315, 320, 322, 323, 325, 330, 331, 333, 337, 340, 344, 370, 375, 377, 355, 356, 357, 390, UV3500, UV3510, UV3570 (available from BYK-Chemie Japan KK), Tegoglide-100, 110, 130, 420, 432, 435, 440, 450, GZ400, Tegorad-2100, 2200, 2250, 2500, 2700 (available from Degussa AG) and the like.

Examples of an ultraviolet inhibitor include a 2-hydroxybenzophenone derivative, a 2-hydroxybenzotriazole derivative, a salicylic acid derivative, a cyanoacrylate derivative and the like.

Examples of a light stabilizer include hindered amine light stabilizer and the like Examples of an antioxidant include butylated hydroxytoluene, propyl gallate, tochopherol, butyl hydroxy anisole, nordihydroguaiaretic acid and the like.

A method of preparing the ink composition according to the present embodiment is not limited particularly. One example of a method of preparing the ink composition is such that the ink composition can be prepared by dispersing and mixing starting materials using a dispersion mixer such as a wet circulation mill, a bead mill, a ball mill, a sand mill, an attritor, a roll mill, an agitator, a Henschel mixer, a colloid mill, an ultrasonic homogenizer, a high pressure homogenizer (micro fluidizer, Nanomizer, Altimizer, Jinasu P Y, DeBEE2000, etc.), bar mill or the like, and adjusting a viscosity and a surface tension at 25° C. to be about 2 to 10 mPa·s and about 25 to 30 mN/m, respectively. It is noted that it is preferable that an obtained ink composition is subjected to filtering with a filter having a pore size of 3 μm or less after dispersing or dissolving the binder resin in order to prevent clogging of the obtained ink composition in an ink jet printer head.

The content of the whole organic solvent in the ink composition according to the present embodiment is an amount obtained by subtracting a total amount of the binder resin, the pigment, the pigment dispersant and the optional components added according to necessity from the total amount of the ink composition. The amount of the organic solvent may be changed appropriately so that the viscosity of the ink composition should be within the above-mentioned range.

An ink jet image can be formed by printing the obtained ink composition on a proper substrate by means of an ink jet printer. Examples of the substrate include plastic substrates of soft PVC, hard PVC, polystyrene, foamed styrol, PMMA, polypropylene, polyethylene, PET, polycarbonate and the like and a mixture or a modified plastic thereof, paper substrates such as a woodfree paper, an art paper, a coated paper and a cast coated paper, glass, a metal substrate such as a stainless steel substrate and the like. Among these, the ink composition can be printed suitably on a substrate at least having a surface layer of a vinyl chloride polymer or an ethylene-vinyl acetate copolymer.

As mentioned above, according to the ink composition according to the present embodiment, a yellowish clear magenta color is developed on the obtained ink jet image. Further, the obtained ink jet image is excellent in weather resistance and is hardly subject to color degradation.

One embodiment of the present invention is described above. The present invention is not restricted particularly to the above-mentioned embodiment. The above-mentioned embodiment refers to the inventions having the following constitutions.

(1) A non-aqueous magenta ink composition for ink jet printing comprising a pigment, a pigment dispersant, a binder resin and an organic solvent, wherein the pigment comprises C.I. Pigment Red 254 and a red pigment having a quinacridone skeleton, and wherein a total amount of the C.I. Pigment Red 254 and the red pigment having a quinacridone skeleton is not less than 50% by mass in the pigment.

According to the constitution mentioned above, a yellowish clear magenta color is developed on the ink jet image obtained from the non-aqueous magenta ink composition for ink jet printing. Further, the obtained ink jet image is excellent in weather resistance and is hardly subject to color degradation.

(2) The non-aqueous magenta ink composition for ink jet printing of above (1), wherein a compounding ratio of the C.I. Pigment Red 254 to the red pigment having a quinacridone skeleton is 8:2 to 2:8.

According to the constitution mentioned above, a yellowish clearer magenta color is developed on the obtained ink jet image. Further, the obtained ink jet image is excellent in weather resistance and is harder to be color-degraded.

(3) The non-aqueous magenta ink composition for ink jet printing of above (1) or (2), wherein the compounding ratio of the C.I. Pigment Red 254 to the red pigment having a quinacridone skeleton is 4:6 to 6:4.

According to the constitution mentioned above, a yellowish further clear magenta color is developed on the obtained ink jet image. Further, the obtained ink jet image is excellent in weather resistance and is further hard to be color-degraded.

(4) The non-aqueous magenta ink composition for ink jet printing of any of above (1) to (3), wherein the pigment having a quinacridone skeleton is at least one selected from C.I. Pigment Violet 19, C.I. Pigment Red 122 and C.I. Pigment Red 202.

According to the constitution mentioned above, a yellowish particularly clear magenta color is developed on the obtained ink jet image. Further, the obtained ink jet image is excellent in weather resistance and is particularly hard to be color-degraded.

(5) The non-aqueous magenta ink composition for ink jet printing of any of above (1) to (4), wherein the pigment having a quinacridone skeleton is C.I. Pigment Red 122.

According to the constitution mentioned above, a yellowish very clear magenta color is developed on the obtained ink jet image. Further, the obtained ink jet image is excellent in weather resistance and is extremely hard to be color-degraded.

(6) The non-aqueous magenta ink composition for ink jet printing of any of above (1) to (5), wherein the binder resin comprises at least either of a vinyl polymer and an acrylic resin, and the vinyl polymer comprises at least one selected from the group consisting of a vinyl chloride polymer, a vinyl chloride-vinyl acetate copolymer and an ethylene-vinyl acetate copolymer.

According to the constitution mentioned above, the binder resin is excellent in solubility in the organic solvent and adhesion to a substrate.

(7) The non-aqueous magenta ink composition for ink jet printing of any of above (1) to (6), wherein the organic solvent comprises alkylene glycol dialkyl ether.

According to the constitution mentioned above, the obtained ink jet image is excellent in drying characteristics and quality of the image.

(8) The non-aqueous magenta ink composition for ink jet printing of any of above (1) to (7), comprising the organic solvent comprising at least one selected from the group consisting of a cyclic ester compound, (poly)propylene glycol monoalkyl ether and (poly)propylene glycol monoalkyl ether monoalkyl ester in a total amount of 1 to 30% by mass.

According to the constitution mentioned above, the obtained ink jet image is more excellent in quality of the image.

EXAMPLE

The present invention is explained below specifically by means of Examples. The present invention is not limited to these Examples. In addition, "%" means "% by mass" and "part" means "part by mass" unless restricted otherwise.

Starting materials used and a preparation method are described below.

<Pigment Dispersant>

SOLSPERSE 39000 (available from The Lubrizol Corporation)

<Binder Resin>

Evaflex E15/45 (vinyl chloride-vinyl acetate copolymer available from Wacker Chemie AG)

SOLBIN C (vinyl chloride-vinyl acetate copolymer available from Nissin Chemical Co., Ltd.)

Dianal BR-87 (acrylic resin available from Mitsubishi Rayon Co., Ltd.)

Examples 1 to 9 and Comparative Examples 1 to 4

Each of starting materials was stirred and mixed in a compounding formulation shown in Table 1, and thus, ink compositions were prepared. A viscosity, weather resistance and color gamut of the obtained ink compositions were evaluated by the following evaluation methods. The results are shown in Table 1.

TABLE 1

|  | Example |  |  |  |  |  |  |  |  |
|---|---|---|---|---|---|---|---|---|---|
|  | 1 | 2 | 3 | 4 | 5 | 6 | 7 | 8 | 9 |
| Pigment | | | | | | | | | |
| C.I. Pigment Red 254 | 0.8 | 1.6 | 2.4 | 3.2 | 1.6 | 1.6 | 1.6 | 1.6 | 1.6 |
| C.I. Pigment Red 122 | 3.2 | 2.4 | 1.6 | 0.8 | 1.6 | 2.4 | 2.4 | — | — |
| C.I. Pigment Violet 19 | — | — | — | — | — | — | — | — | — |
| C.I. Pigment Red 202 | — | — | — | — | — | — | — | — | 2.4 |
| C.I. Pigment Red 146 | — | — | — | — | 0.8 | — | — | — | — |
| Organic solvent | | | | | | | | | |
| Diethylene glycol diethyl ether | 51 | 51 | 51 | 51 | 51 | 51 | 61 | 51 | 51 |
| Propylene carbonate | 20 | 20 | 20 | 20 | 20 | 20 | 20 | 20 | 20 |
| Tetraethylene glycol dimethyl ether | 20 | 20 | 20 | 20 | 20 | 20 | 10 | 20 | 20 |
| Pigment dispersant | | | | | | | | | |
| SS39000 | 2 | 2 | 2 | 2 | 2 | 2 | 2 | 2 | 2 |
| Binder resin | | | | | | | | | |
| E15/45 | 3 | 3 | 3 | 3 | 3 | — | — | 3 | 3 |
| SOLBIN C | — | — | — | — | — | 3 | — | — | — |
| BR87 | — | — | — | — | — | — | 3 | — | — |
| Total | 100 | 100 | 100 | 100 | 100 | 100 | 100 | 100 | 100 |
| Evaluation | | | | | | | | | |
| Viscosity | 5.1 | 4.7 | 4.5 | 4.3 | 4.3 | 4.9 | 4.6 | 4.6 | 4.8 |
| Weather resistance | B | A | A | A | B | A | A | A | A |
| Color gamut | A | A | A | B | A | A | A | B | A |
| Ejection stability | A | A | A | A | A | A | A | A | A |
| Solid embedment | A | A | A | A | A | A | A | A | A |

|  | Comparative Example | | | |
|---|---|---|---|---|
|  | 1 | 2 | 3 | 4 |
| Pigment | | | | |
| C.I. Pigment Red 254 | 4 | — | — | 0.5 |
| C.I. Pigment Red 122 | — | 4 | — | 0.5 |
| C.I. Pigment Violet 19 | — | — | — | — |
| C.I. Pigment Red 202 | — | — | — | — |
| C.I. Pigment Red 146 | — | — | 4 | 3 |
| Organic solvent | | | | |
| Diethylene glycol diethyl ether | 51 | 51 | 51 | 51 |
| Propylene carbonate | 20 | 20 | 20 | 20 |
| Tetraethylene glycol dimethyl ether | 20 | 20 | 20 | 20 |
| Pigment dispersant | | | | |
| SS39000 | 2 | 2 | 2 | 2 |
| Binder resin | | | | |
| E15/45 | 3 | 3 | 3 | 3 |
| SOLBIN C | — | — | — | — |
| BR87 | — | — | — | — |
| Total | 100 | 100 | 100 | 100 |
| Evaluation | | | | |
| Viscosity | 3.8 | 3.8 | 3.8 | 4.4 |
| Weather resistance | A | B | C | C |

TABLE 1-continued

| Color gamut | C | C | A | A |
| Ejection stability | A | A | A | A |
| Solid embedment | A | A | A | A |

(Viscosity)

Viscosities of the ink compositions at 25° C. were measured by using a viscometer (RE100L type viscometer available from TOKI SANGYO CO., LTD.).

(Weather Resistance)

Each of ink compositions prepared in Examples 1 to 9 and Comparative Examples 1 to 4 was subjected to color exhibition on a vinyl chloride substrate using Meyaba having a diameter of 0.15 mm. Thereafter, weathering test was conducted for 1,000 hours using a weatherometer (Q-SUN manufactured by Q-Lab Co., Ltd.) and a color difference ΔE was measured using a spectrophotometer (Spectro Eye manufactured by X-Rite Co., Ltd.). With respect to the obtained color difference ΔE, light fastness was evaluated in accordance with the following evaluation criteria. The smaller the color difference ΔE is, the better the weather resistance is.

(Evaluation Criteria)

A: ΔE was less than 10.
B: ΔE was 10 or more and less than 20.
C: ΔE was 20 or more.

(Color Gamut)

Each of ink compositions prepared in Examples 1 to 9 and Comparative Examples 1 to 4 was subjected to color exhibition on a vinyl chloride substrate using Meyaba having a diameter of 0.15 mm. Thereafter, a b* value in L*a*b* color system was calculated using a spectrophotometer (Spectro Eye manufactured by X-Rite Co., Ltd.). With respect to the obtained b* value, light fastness was evaluated in accordance with the following evaluation criteria. It is noted that when the b* value is about more than 5 and about less than 25, it can be evaluated such that a magenta color having a proper yellowness is exhibited.

(Evaluation Criteria)

A: b* was more than 5 and less than 25.
B: b* was more than 0 and 5 or less, or 25 or more and less than 30.
C: b* was 10 or less, or 30 or more.

(Ejection Stability)

Each of ink compositions prepared in Examples 1 to 9 and Comparative Examples 1 to 4 was printed on a polyvinyl chloride sheet (trade name Kapujet gurosubana manufactured by FILMOLUX CO., LTD.) and ejection stability was evaluated by the number of sheets when an unprinted part arises.

(Evaluation Criteria)

A: An unprinted part did not arise after $71^{st}$ sheet, or an unprinted part did not arise up to $100^{th}$ sheet.
B: An unprinted part arose between the $51^{st}$ sheet and the $71^{th}$ sheet.
C: An unprinted part arose before $50^{th}$ sheet.

(Solid Embedment)

Each of ink compositions prepared in Examples 1 to 9 and Comparative Examples 1 to 4 was subjected to solid printing on a polyvinyl chloride sheet (trade name Kapujet gurosubana manufactured by FILMOLUX CO., LTD.) by a high speed printing mode, and with respect to filling of a solid portion, whether or not there is white spot printing in a printed image, namely whether or not solid embedment is satisfactory was evaluated visually.

(Evaluation Criteria)

A: There was no white spot printing.
B: There was somewhat white spot printing.
C: There was a lot of white spot printing.

As shown in Table 1, in any of the ink compositions of Examples 1 to 9 comprising C.I. Pigment Red 254 and a red pigment having a quinacridone skeleton in an amount of 50% by mass or more in the pigment, weather resistance was excellent and a color having strong yellowness could be exhibited. Further, each of the ink compositions prepared in Examples 1 to 9 has good ejection stability and solid embedment (white spot printing). On the other hand, in the ink compositions of Comparative Examples 1 to 4, where either of the above-mentioned pigments is not contained or a total amount of the pigments is smaller than a predetermined amount, weather resistance was inferior or a magenta color having a proper yellowness could not be exhibited.

The invention claimed is:

1. A non-aqueous magenta ink composition for ink jet printing comprising a pigment, a pigment dispersant, a binder resin and an organic solvent,
   wherein the pigment comprises C.I. Pigment Red 254 and a red pigment having a quinacridone skeleton,
   wherein a total amount of the C.I. Pigment Red 254 and the red pigment having a quinacridone skeleton is not less than 50% by mass in the pigment,
   wherein the compounding ratio of the C.I. Pigment Red 254 to the red pigment having a quinacridone skeleton is 4:6 to 6:4, and
   wherein the organic solvent comprises alkylene glycol dialkyl ether.

2. The non-aqueous magenta ink composition for ink jet printing of claim 1, wherein the pigment having a quinacridone skeleton is at least one selected from C.I. Pigment Violet 19, C.I. Pigment Red 122 and C.I. Pigment Red 202.

3. The non-aqueous magenta ink composition for ink jet printing of claim 1, wherein the pigment having a quinacridone skeleton is C.I. Pigment Red 122.

4. The non-aqueous magenta ink composition for ink jet printing of claim 1, wherein the binder resin comprises at least either of a vinyl polymer and an acrylic resin, and the vinyl polymer comprises at least one selected from the group consisting of a vinyl chloride polymer, a vinyl chloride-vinyl acetate copolymer and an ethylene-vinyl acetate copolymer.

5. The non-aqueous magenta ink composition for ink jet printing of claim 1, comprising the organic solvent comprising at least one selected from the group consisting of a cyclic ester compound, (poly)propylene glycol monoalkyl ether and (poly)propylene glycol monoalkyl ether monoalkyl ester in a total amount of 1 to 30% by mass in the non-aqueous magenta ink composition.

* * * * *